(12) United States Patent
Pizzichil

(10) Patent No.: US 7,451,538 B2
(45) Date of Patent: Nov. 18, 2008

(54) METHOD FOR FABRICATING ROTOR ASSEMBLY

(75) Inventor: William P. Pizzichil, Easley, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 365 days.

(21) Appl. No.: 11/230,877

(22) Filed: Sep. 20, 2005

(65) Prior Publication Data

US 2007/0062026 A1 Mar. 22, 2007

(51) Int. Cl.
*H01R 43/06* (2006.01)

(52) U.S. Cl. ............... 29/597; 29/596; 29/598; 29/732; 310/269

(58) Field of Classification Search ........... 29/596–598, 29/732–736; 310/207, 260, 216, 217, 269, 310/254, 218; 72/327
See application file for complete search history.

(56) References Cited

U.S. PATENT DOCUMENTS

| | | | |
|---|---|---|---|
| 729,449 A | 5/1903 | Thomson | |
| 1,375,461 A | 4/1921 | Kimble | |
| 1,506,753 A | 9/1924 | Hoey | |
| 1,719,829 A | 7/1929 | Bunker | |
| 1,722,984 A | 7/1929 | Hendry | |
| 1,751,559 A | 3/1930 | Schou | |
| 1,762,017 A * | 6/1930 | Grenzer | 29/598 |
| 1,921,140 A | 8/1933 | Smith | |
| 2,248,167 A * | 7/1941 | Elsey | 29/598 |
| 2,470,767 A | 5/1949 | Ellis | |
| RE23,460 E | 2/1952 | Felici | |
| 2,767,340 A | 10/1956 | Martiny | |
| 2,991,378 A | 7/1961 | Barney | |
| 3,134,040 A | 5/1964 | Barth | |
| 3,488,532 A | 1/1970 | Endress et al. | |
| 3,521,098 A | 7/1970 | Jesse | |
| 3,597,835 A * | 8/1971 | Scaillet et al. | 29/598 |
| 3,665,593 A * | 5/1972 | Savage | 29/598 |
| 3,688,141 A | 8/1972 | Maslennikov et al. | |
| 3,743,873 A | 7/1973 | de Jong | |
| 3,902,087 A | 8/1975 | Hakamada et al. | |
| 4,079,512 A * | 3/1978 | Lakes | 29/732 |
| 4,095,627 A | 6/1978 | Lonseth et al. | |

(Continued)

FOREIGN PATENT DOCUMENTS

JP  10234166  9/1998

*Primary Examiner*—Minh Trinh
(74) *Attorney, Agent, or Firm*—Thompson Coburn LLP

(57) ABSTRACT

In accordance with one embodiment, the present technique provides an apparatus for assembling a rotor. The exemplary apparatus includes a base that has a central aperture and a seating surface for receiving the rotor. An arbor then extends through the central aperture, the arbor having a longitudinal axis that is substantially orthogonal to the seating surface, and including threaded ends opposite with respect to one another. The exemplary apparatus also includes at least one member of a family of fixtures coupleable to the arbor, the family including a pressure fixture that has first and second piston assemblies disposed at diametrically opposite locations to one another, the family also including a support fixture coupleable the arbor and having members extending axially therefrom, the members being configured to support securing members of the rotor. Advantageously, the exemplary apparatus provides for a mechanism through which a securing member may be symmetrically installed with respect to the rotor core, thus improving rotor performance and construction.

7 Claims, 9 Drawing Sheets

U.S. PATENT DOCUMENTS

| | | |
|---|---|---|
| 4,249,098 A | 2/1981 | Karlen et al. |
| 4,939,398 A | 7/1990 | Lloyd |
| 5,174,009 A * | 12/1992 | Martin ............ 29/564.6 |
| 5,304,877 A | 4/1994 | Baek |
| 5,512,792 A | 4/1996 | Bawin et al. |
| 5,642,010 A | 6/1997 | Carosa et al. |
| 5,698,929 A | 12/1997 | Seki et al. |
| 5,719,457 A | 2/1998 | Helfer |
| 5,869,915 A | 2/1999 | Blake |
| 5,886,443 A | 3/1999 | Dymond et al. |
| 5,937,508 A * | 8/1999 | Shiga ............ 29/598 |
| 6,022,637 A | 2/2000 | Wilson |
| 6,170,146 B1 * | 1/2001 | Katagiri et al. ............ 29/597 |
| 6,177,750 B1 | 1/2001 | Tompkin |
| 6,380,655 B1 | 4/2002 | Ide et al. |
| 6,745,456 B2 * | 6/2004 | Wood ............ 29/598 |
| 6,787,966 B2 * | 9/2004 | Haga ............ 310/269 |
| 2004/0012293 A1 | 1/2004 | Kuemmlee et al. |
| 2004/0113508 A1 | 6/2004 | Yasuhara et al. |
| 2005/0134137 A1 | 6/2005 | Sweo |
| 2006/0267441 A1 | 11/2006 | Hang et al. |

\* cited by examiner

METHOD FOR FABRICATING ROTOR ASSEMBLY

BACKGROUND

The present technique relates generally to the field of electrical machines, and particularly to rotors for induction devices, such as a fabricated squirrel cage rotor, for example.

Electrical machines, such a motors and generators, are commonly found in industrial, commercial, and consumer settings. In industry, such machines are employed to drive various kinds of devices, including pumps, conveyors, compressors, fans, and so forth, to mention only a few, and are employed to generate electrical power. In the case of electric motors and generators, these devices generally include a stator, comprising a multiplicity of stator windings, surrounding a rotor.

By establishing an electromagnetic relationship between the rotor and the stator, electrical energy can be converted into kinetic energy, and vice-versa. In the case of alternating current (ac) motors, ac power applied to the stator windings effectuates rotation of the rotor. The speed of this rotation is typically a function of the frequency of the ac input power (i.e., frequency) and of the motor design (i.e., the number of poles defined by the stator windings). Advantageously, a rotor shaft extending through the motor housing takes advantage of this produced rotation, translating the rotor's movement into a driving force for a given piece of machinery. Conversely, in the case of an ac generator, rotation of an appropriately magnetized rotor induces current within the stator windings, in turn producing electrical power.

Often, design parameters call for relatively high rotor rotation rates, i.e., high rpm. By way of example, a rotor within a high-speed induction motor may operate at rates as high as 10,000 rpm, and beyond. Based on the diameter of the rotor, operation at such rpm translates into relatively high surface speeds on the rotor. Again, by way of example, these rotor surface speeds can reach values of 100 meters per second (mps), and beyond. During operation, particularly during high-speed operation, produced centripetal and centrifugal forces strain various components of the rotor assembly. For example, if not properly accounted for, the centripetal and centrifugal forces developed in the end ring may cause the end ring to prematurely malfunction. Moreover, these centripetal and centrifugal forces may, overtime, negatively affect the mechanical integrity of the rotor, leading to a lessening of performance and, in certain instances, failure of the motor. Undeniably, loss of performance and motor failure are events that can lead to unwanted costs and delays.

In traditional motors, the end ring and the electrical conductors extending through the rotor core are mechanically and electrically coupled via a brazing process (e.g., solder). By way of example, the conductor and the end ring may be soldered together using a hard solder with a high melting point. Unfortunately, heat generated during a brazing process can negatively affect the material of the end rings and/or the conductor. For example, developed heat can cause annealing in the end rings and/or conductors. In turn, such annealing reduces the yield strength of the annealed material, thereby increasing the likelihood of damage due to centripetal and centrifugal forces within the rotor, for instance.

A technique for mechanically securing the end rings to the rotor core is described in U.S. patent application Ser. No. 10/955,680 entitled "HIGH MECHANICAL STRENGTH ELECTRICAL CONNECTION SYSTEM AND METHOD," which was filed on Sep. 30, 2004, and incorporated herein by reference. By way of example, the end rings may be mechanically secured to rotor through the use of a copper bushing that surrounds ends of the rotor's conductor bars and are located within end slots of the end rings into which these conductor bars extend. In summary, the abutment of the bushing with the rotor's conductor bars and the respective end rings presents a mechanical engagement that secures the end rings to the rotor and, furthermore, secures the rotor assembly.

When employing such mechanical techniques, difficulties can arise during the assembly process. For example, it can be burdensome to transfer the rotor core stack between a station for stack compression and a station bushing insertion. Moreover, such bifurcated assembly employs two independent machines, increasing costs for manufacturing. Additionally, providing for symmetrical insertion of the bushings often present challenges that, in some cases, can lead to asymmetries in the assembled rotor. Such asymmetries can negatively impact rotor performance.

There exists a need, therefore, for a method and apparatus for improved rotor construction and integrity.

BRIEF DESCRIPTION

In accordance with one embodiment, the present technique provides an apparatus for assembling a rotor. The exemplary apparatus includes a base that has a central aperture and a seating surface for receiving the rotor. An arbor then extends through the central aperture, the arbor having a longitudinal axis that is substantially orthogonal to the seating surface, and including threaded ends opposite with respect to one another. The exemplary apparatus also includes at least one member of a family of fixtures coupleable to the arbor, the family including a pressure fixture that has first and second piston assemblies disposed at diametrically opposite locations to one another, the family also including a support fixture coupleable the arbor and having members extending axially therefrom, the members being configured to support securing members of the rotor. Advantageously, the exemplary apparatus provides for a mechanism through which a securing member may be symmetrically installed with respect to the rotor core, thus improving rotor performance and construction.

Additionally, the exemplary technique provides a method for assembling a rotor. The assembly comprises providing a rotor core having first and second end rings and a plurality of rotor laminations disposed between these end rings. The rotor core is then assembled by seating a plurality of securing members with respect to a plurality of conductor bars extending axially through the rotor core such that the securing members are disposed about the conductor bars and at least partially in the end slots of one of the first and second rings. Once seated, the exemplary method includes the act of providing insertion forces to a first pair of locations angularly most distant with respect to one another and still aligned with the first pair of securing members. The insertion forces then drive the first pair of securing members inward with respect to the rotor. This inward driving then fully seats the securing members, and, in turn, secures the end ring to the rotor core.

DRAWINGS

These and other features, aspects and advantages of the present invention will become better understood when the following detailed description is read with reference to the accompanying drawings in which like characters represent like parts throughout the drawings, wherein.

Figure 6A:
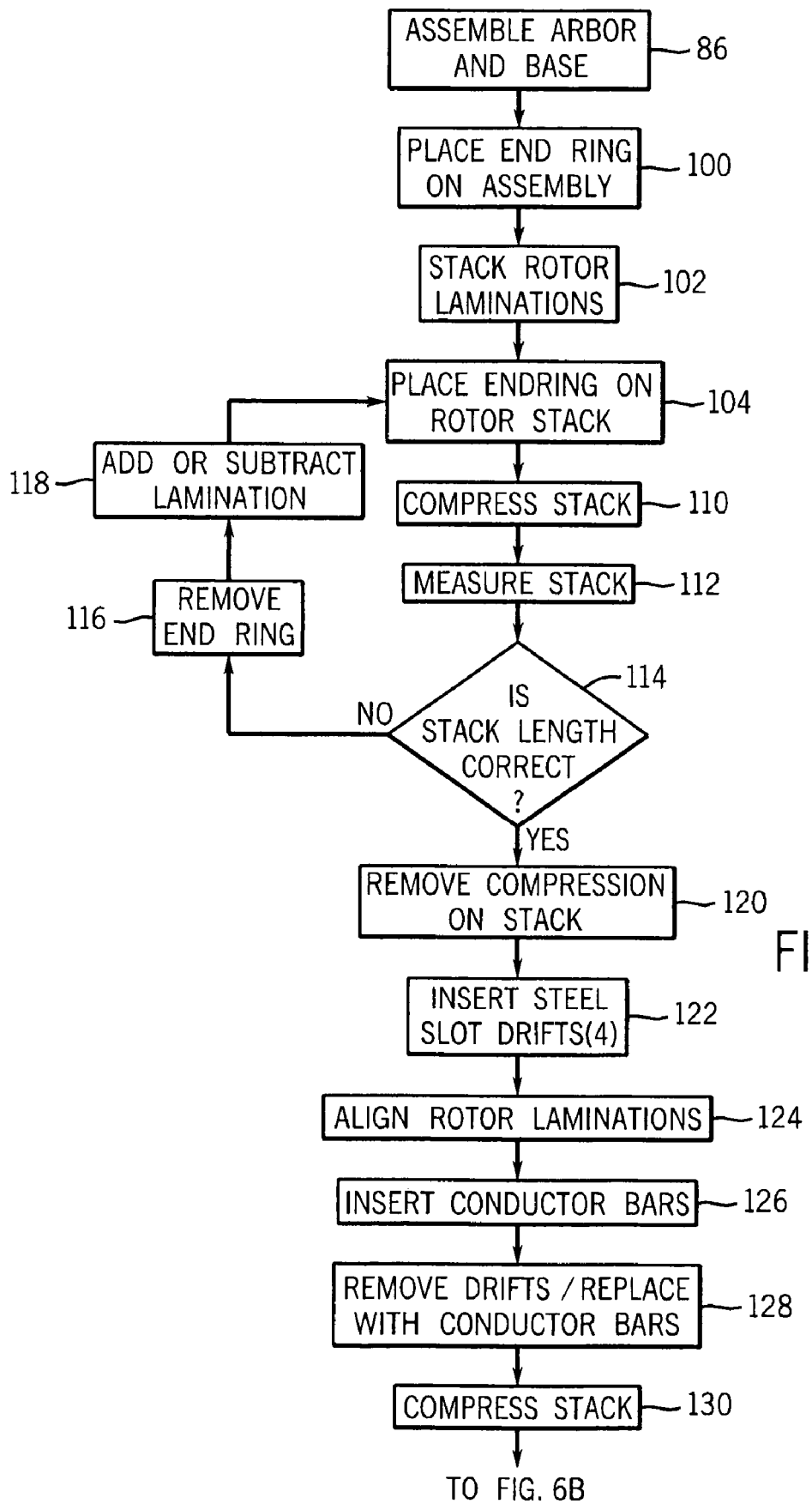
Figure 6B:
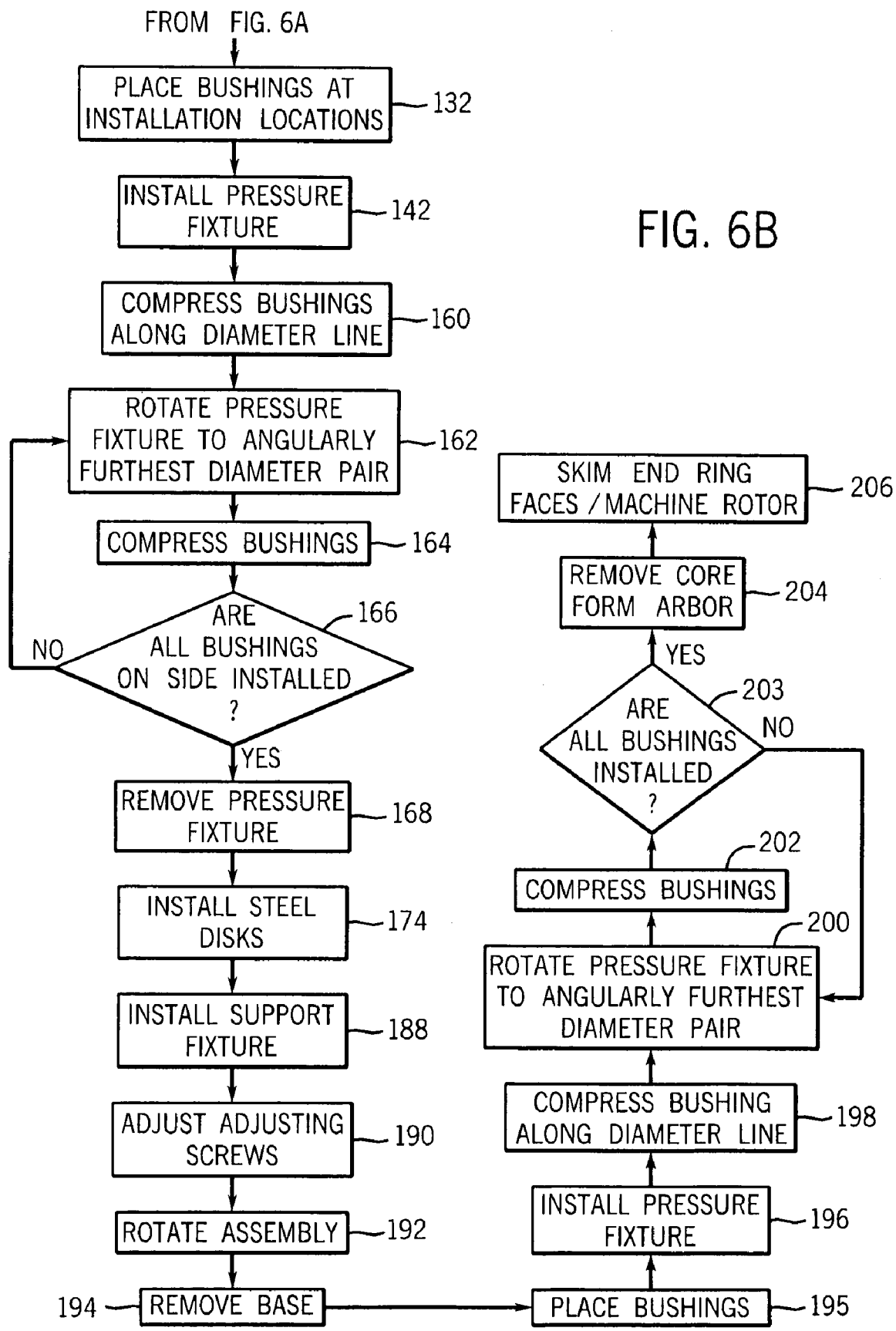
Figure 7:
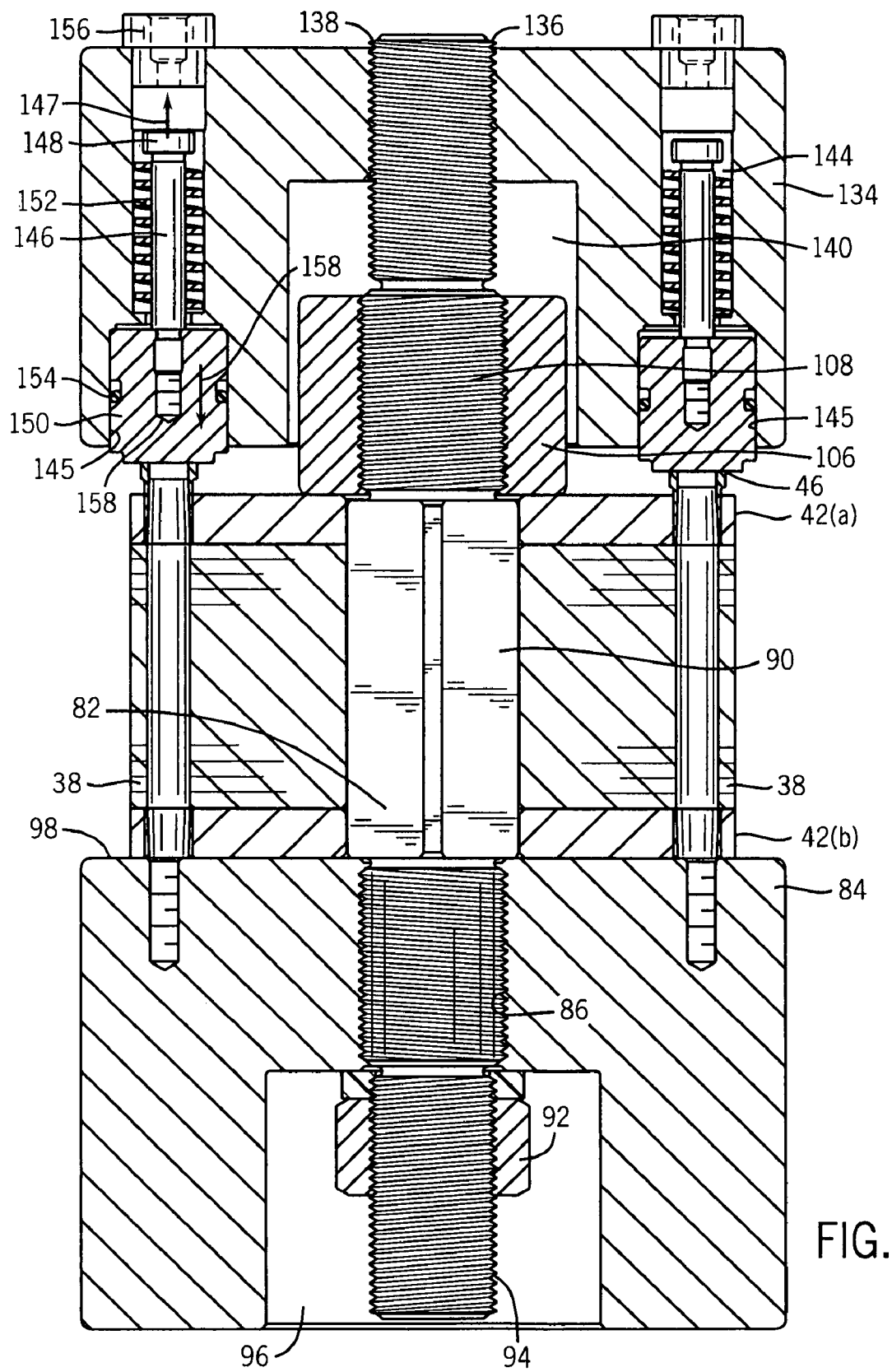
Figure 8:
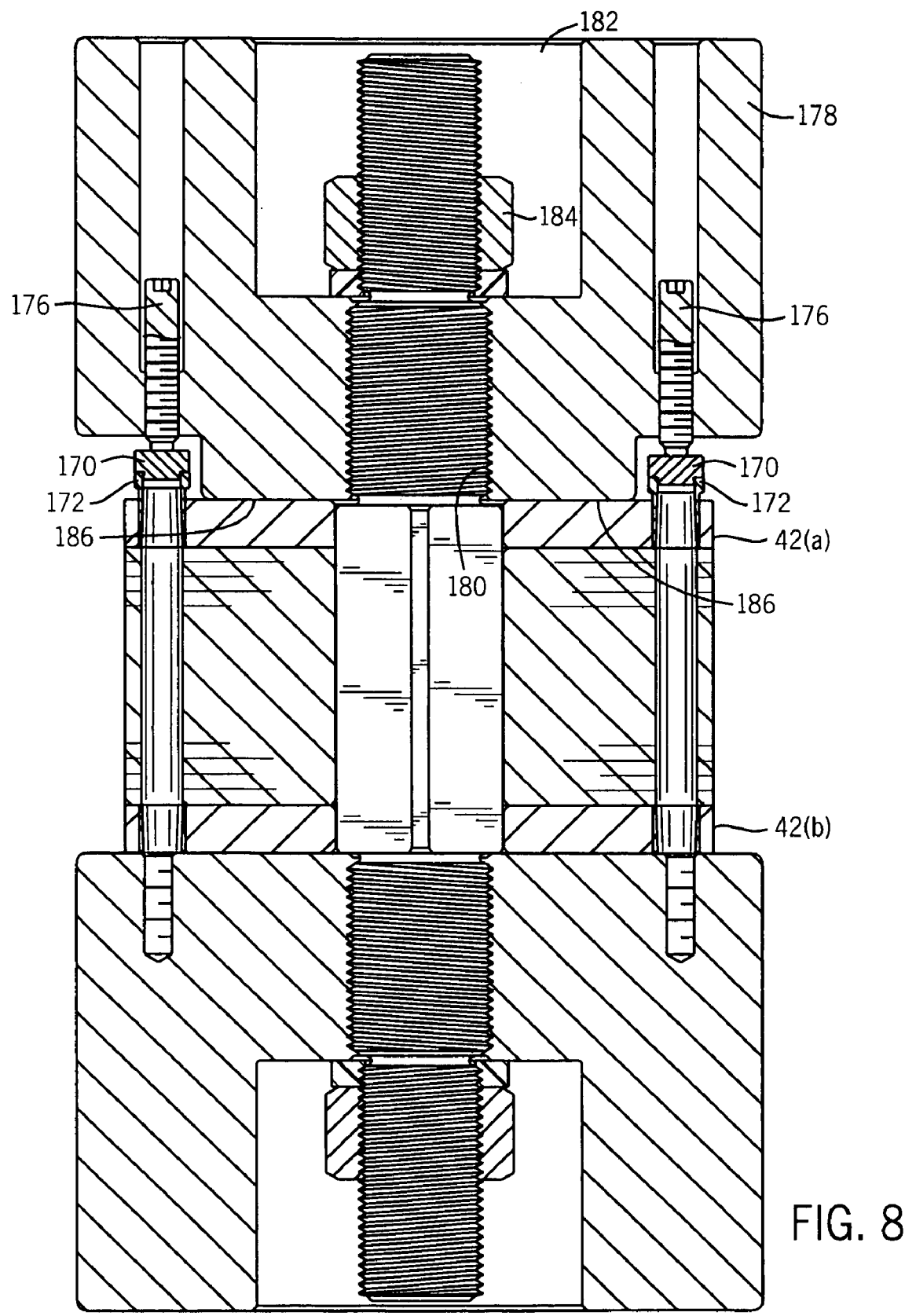
Figure 9:
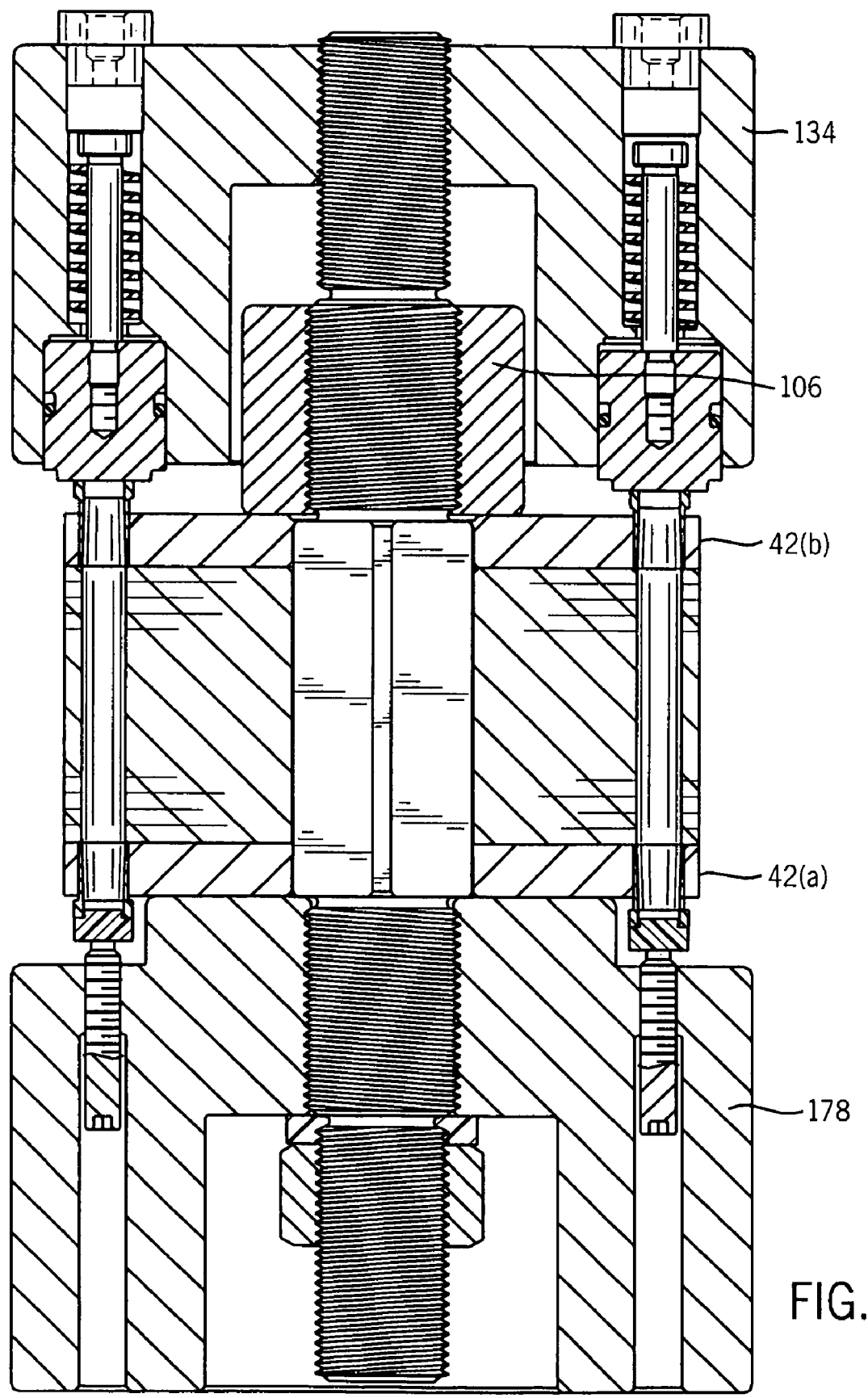

FIGS. 6A and 6B present a flow chart representative of an exemplary process for assembling a rotor, in accordance with an embodiment of the present technique;

FIG. 7 is a cross-sectional view of a rotor-manufacturing assembly during certain assembly stages of a rotor, in accordance with an embodiment of the present technique;

FIG. 8 is a cross-sectional view of the rotor-manufacturing assembly of FIG. 7 during certain other assembly stages of the rotor; and FIG. 9 is a cross-sectional view of the rotor-manufacturing assembly during yet other certain assembly stages of the rotor.

DETAILED DESCRIPTION

As discussed in detail below, embodiments of the present technique provide apparatus and methods related to the manufacture of rotors for induction devices. Although the following discussion focuses on induction motors and generators, the present technique also affords benefits to a number of applications in which rotor integrity and design is a concern. Accordingly, the following discussion provides exemplary embodiments of the present technique and, as such, should not be viewed as limiting the appended claims to the embodiments described.

Figure 1:
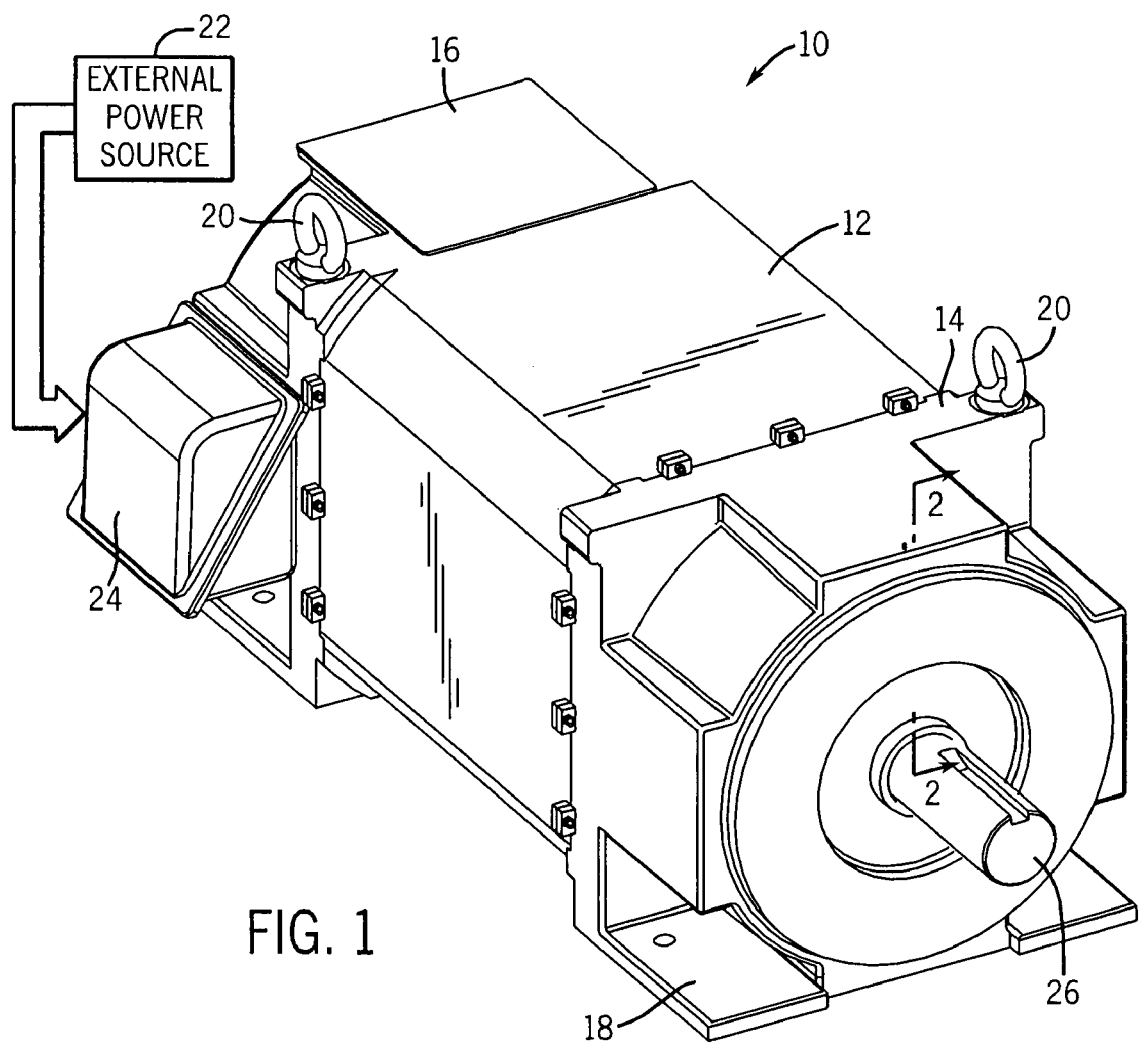
FIG. 1 is a perspective view of an induction device, in accordance with an embodiment of the present technique.

Turning to the drawings, FIG. 1 illustrates an exemplary electric motor 10. The exemplary motor 10 is an induction motor housed in a motor housing and includes a frame 12 capped at each end by end caps 14 and 16, respectively. The frame 12 and the end caps 14 and 16 may be formed of various materials, such as cast iron, steel, aluminum or any other suitable structural material. Advantageously, the end caps 14 and 16 may include mounting and transportation features, such as the illustrated mounting feet 18 and eyehooks 20. Those skilled at the art will appreciate in light of the following description that a wide variety motor configurations and devices may employ the techniques outlined below.

To induce rotation of the rotor, current is routed through stator winding disposed in the stator. (See FIG. 2.) These stator windings are electrically interconnected to form groups, which are, in turn, interconnected in a manner generally known in the pertinent art. The stator windings are further coupled to terminal leads, which electrical connect the stator windings to an external power source 22. By way of example, the external power source 22 may comprise an ac pulse with modulated (PWM) inverter. As yet another example, the external power source 22 may comprise a three-phase ac power source. In any event, a conduit box 24 houses the electrical connection between the terminal leads and the external power source 22 for the exemplary motor 10. The conduit box 24 can be formed of metal or plastic material and, advantageously, provides access to certain electrical components of the motor 10.

When electrical current from the external power source 22 is routed through the stator windings, a magnetic field that induces rotation of the rotor is produced. A rotor shaft 26, which is coupled to the rotor, rotates in conjunction with the rotor. That is, rotation of the rotor translates into a corresponding rotation of the rotor shaft 26. To support and facilitate rotation of the rotor and the rotor shaft 26, the motor 10 includes bearing sets that are carried within the end caps 14 and 16, respectively. (See FIG. 2.) As will be appreciated by those of ordinary skill in the art, the rotor shaft 26 may couple to any number of drive machine elements, thereby transmitting torque to the given drive machine element. By way of example, machines such as pumps, compressors, fans, conveyers and so forth, may harness the rotational motion of the rotor shaft 26 for operation.

Figure 2:
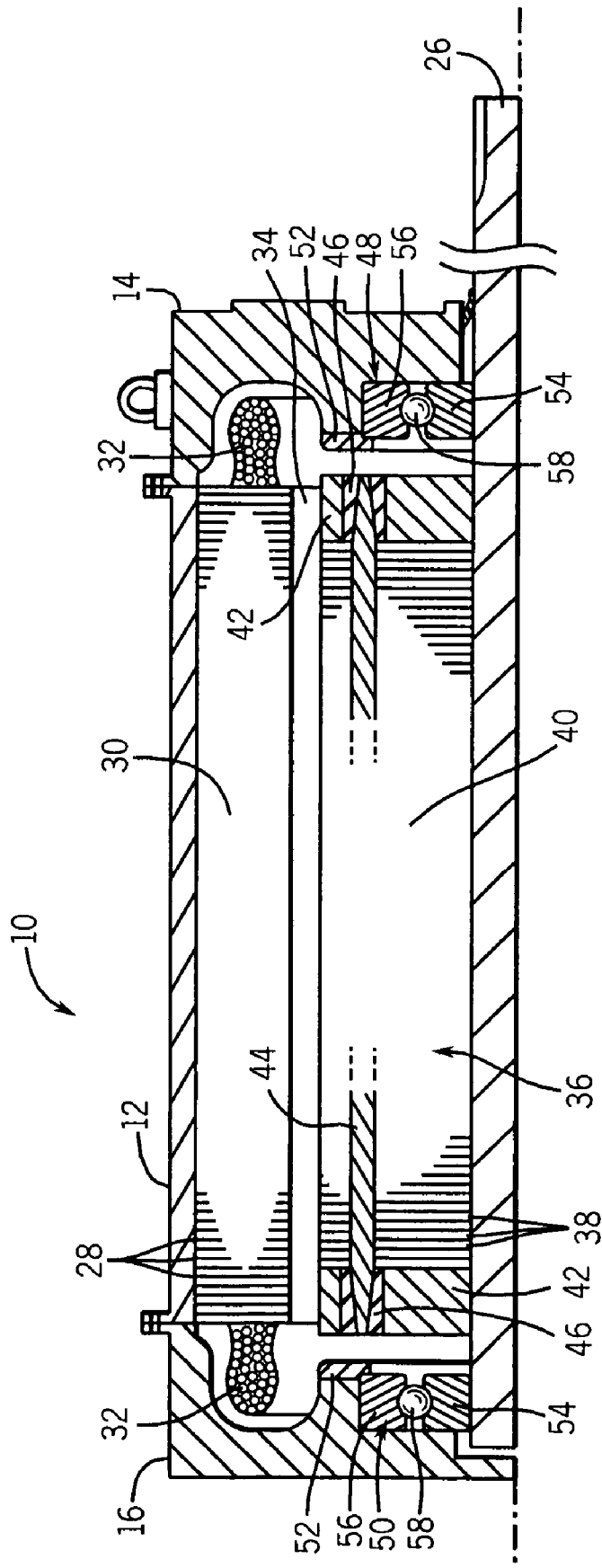
FIG. 2 is a partial cross-sectional view of the induction device of FIG. 1 along line 2-2.

FIG. 2 provides a partial cross-section view of the exemplary motor 10 of FIG. 1 along line 2-2. For the sake of simplicity, only the top portion of the motor is illustrated, as the structure of the exemplary motor 10 is essentially mirrored along its centerline. The motor 10 includes a plurality of stator laminations 28 that are juxtaposed and aligned with respect to one another to form a stator core 30. Each exemplary stator lamination 28 includes features that cooperate with features of adjacent stator laminations 28 to form cumulative features that extend the length of the stator core 30. For example, each stator lamination 28 has an aperture that extends through the lamination and that cooperates with apertures of adjacent stator laminations to form slots that extend the length of the stator core 30 and that are configured to receive one or more turns of a coil winding, which are illustrated as coil ends 32 in FIG. 2. Each stator lamination 28 also has a central aperture, which, when aligned with the central apertures of adjacent stator laminations 28, forms a contiguous rotor chamber 34 that extends through the stator core 30.

A rotor 36 resides within this rotor chamber 34. Similar to the stator core 30, the exemplary rotor 36 is formed of a plurality of rotor laminations 38 that are aligned and adjacently placed with respect to one another. Thus, the rotor laminations 38 cooperate to form the contiguous rotor core 40. The illustrated rotor 36 also includes end members, such as the illustrated end rings 42, that are disposed on opposite ends of the rotor core 40. These end rings 42 cooperate with other components to secure the rotor laminations 38 with respect to one another, as discussed further below. The rotor 36 also includes electrically conductive members, such as the illustrated conductor bars 44, that extend the length of the rotor 36. The end rings 42, in cooperation with securing members 46 disposed in end slots (see FIG. 3) of the end rings 42, electrical couple the conductor bars to the end ring 42 and, as such, one another. To facilitate electrical communications, the conductor bars 44, the exemplary end rings 42 and the securing members 46 are formed of non-magnetic, yet electrically conductive materials.

To support the rotor 36 and the rotor shaft 26, the illustrated motor 10 also includes bearing sets 48 and 50 that are each disposed in the respective end caps 14 and 16 and that are each secured to the rotor shaft 26. These bearings sets 48 and 50 facilitate rotation of the rotor shaft 26 and rotor 36 within the stator core 30. By way of example, the exemplary bearing sets 48 and 50 have a ball bearing construction; however, the bearing sets 48 and 50 may have a sleeve bearing construction, among other types of bearing constructions. Advantageously, the end caps 14 and 16 include features, such as the illustrated inner bearing caps 52, that secure the bearing sets 48 and 50 within their respective end caps 14 and 16. The bearing sets 48 and 50 receive and transfer the radial and thrust loads produced by the rotor shaft 26 and the rotor 36 during operation of the motor to the motor housing, i.e., the frame 12 and the end caps 14 and 16.

Each bearing set 48 and 50 includes an inner race 54 disposed circumferentially about the rotor shaft 26. The fit between the inner races 54 and the rotor shaft 26 causes the inner races 54 of each bearing set to rotate in conjunction with the rotor shaft 26. Each bearing set 48 and 50 also includes an outer race 56 and rolling elements 58, which are disposed between the inner race 54 and the outer race 56. The rolling elements 58 facilitate rotation of the inner races 54, while the outer races 56 remain stationarlily mounted with respect to the end caps 14 and 16. Thus, the bearing sets 48 and 50 facilitate rotation of the rotor shaft 26 and the rotor 36 and provide a support structure for the rotor 36 and rotor shaft 26 within the motor housing. Advantageously, a lubricant coats the rolling elements 58 and races 54 and 56 of each bearing set 48 and 50, thereby providing a separating film between the various components of the bearing sets. This lubricant mitigates the likelihood of seizing, galling, welding, excessive friction and/or excessive wear, to name but a few adverse effects.

Figure 3:
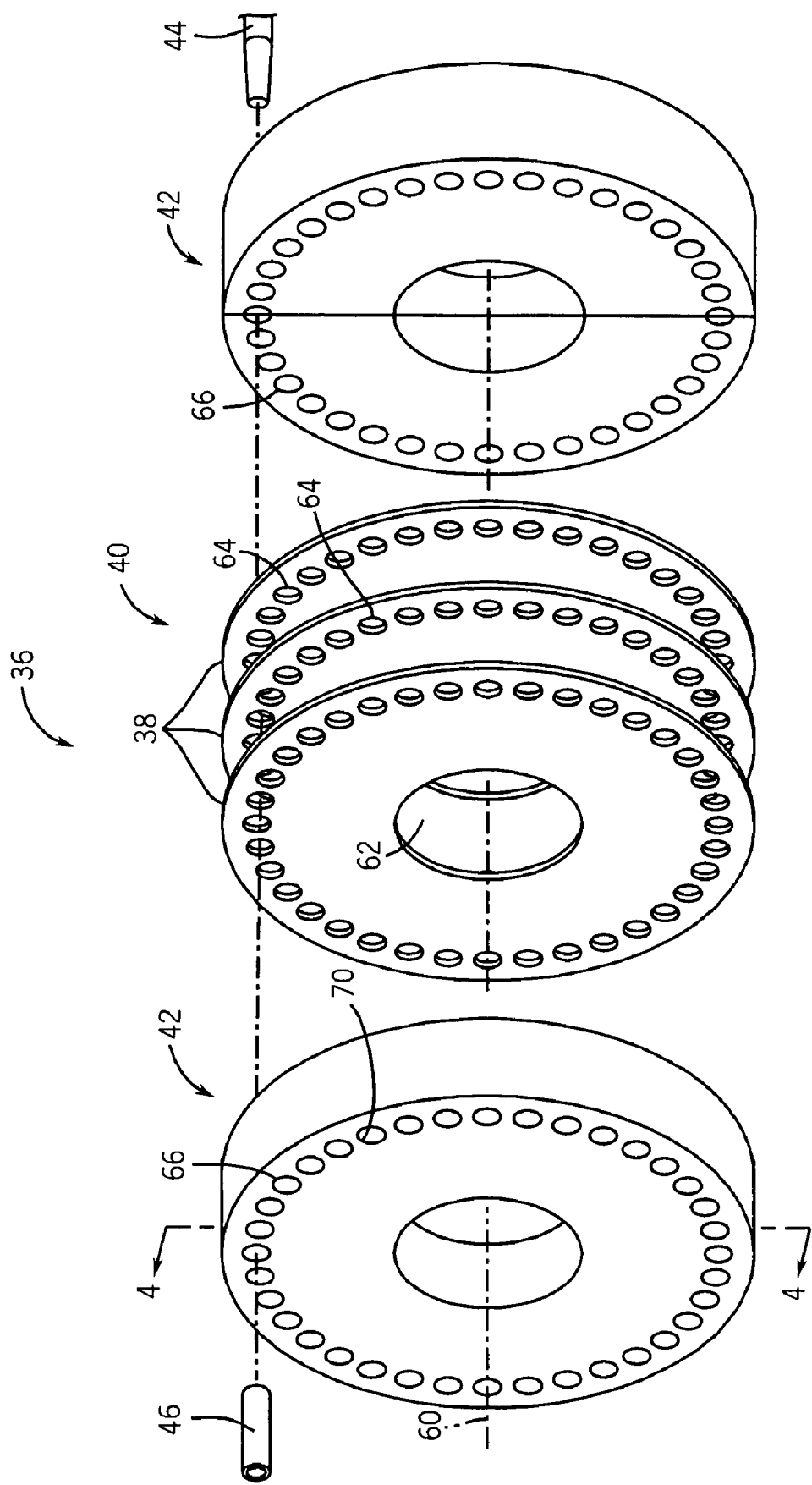
FIG. 3 is an exploded perspective view of a rotor, in accordance with an embodiment of the present technique.

FIG. 3 presents an exploded view of an exemplary rotor 36, which includes a series of rotor laminations 38 disposed between a pair of end rings 42. To maintain symmetry, the rotor laminations 38 and the end rings 42 are disposed concentrically along an axial centerline 60 of the rotor 36. That is, the axial centerline 60 of the rotor 36 passes through the center of each of the end rings 42 and each of the rotor laminations 38. Accordingly, the axial centerline 60 defines an axis of rotation for the assembled rotor 36.

Focusing on the exemplary rotor laminations 38, each rotor lamination 38 presents a generally circular cross-section and is formed of a magnetically conductive material. Extending from end-to-end, i.e., transverse to the cross-section, each rotor lamination 38 includes features that cooperate with corresponding features of adjacent rotor laminations 38 to form cumulative features that extend the length of the rotor core 40. For example, each rotor laminations 38 has a circular shaft aperture 62 that is located in the center of the rotor lamination 38 and that extends from end-to-end. The shaft apertures 60 of adjacent rotor laminations 38 cooperate to form a shaft chamber configured to receive the rotor shaft 26 (See FIG. 2) therethrough. Additionally, each rotor lamination 38 has a series of rotor slots 64 that are concentrically arranged with respect to one another and about the centerline 60. In the illustrated rotor laminations 38, thirty-six rotor slots 64 are arranged in a slot pattern and are at equiangular and symmetric positions with respect to one another. As will be appreciated by one of ordinary skill in the art in view of this discussion, other slot patterns and arrangements may also be envisaged. For example, the rotor laminations 38 may have twenty-four rotor slots that are arranged in any number of configurations. When the rotor laminations 38 are assembled with respect to one another the rotor slots cooperate to form rotor channels (See FIG. 2) that extend through the rotor core 40. These rotor channels are configured to receive electrically conductive and non-magnetic members (i.e., conductor bars 44) therethrough.

Figure 4:
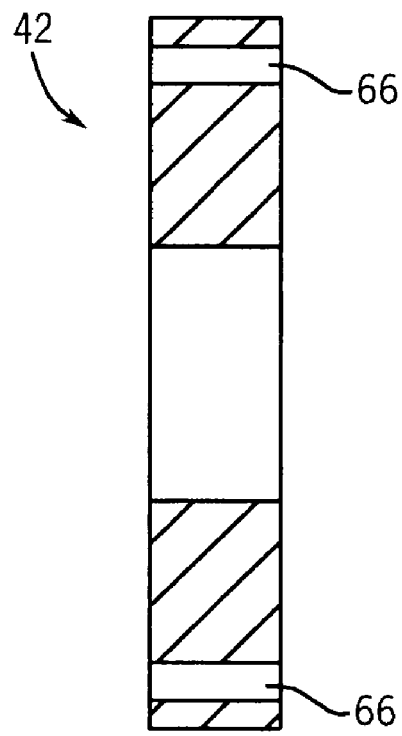
FIG. 4 is a cross-sectional view of an end member of the rotor of FIG. 3 along line 4-4.

The end rings 42, which are disposed on opposite ends of the rotor core 40, also present features that are advantageous to the rotor 36. For example, each exemplary end ring 42 has a series of end slots 66 that are arranged concentrically with respect to one another and that extend through the end ring 42. (See FIG. 4.) As illustrated, each exemplary end ring 42 has thirty-six end slots 66 that are arranged in a slot pattern that corresponds with the slot pattern of the rotor laminations 38. Accordingly, when aligned and assembled, the end slots 66 and the rotor slots 64 cooperate to define a plurality of rotor channels (see FIG. 2) that extend through the rotor core 40 and the end rings 42 and that receive the conductor bars 44 therethrough. (See FIG. 2.)

Figure 5:
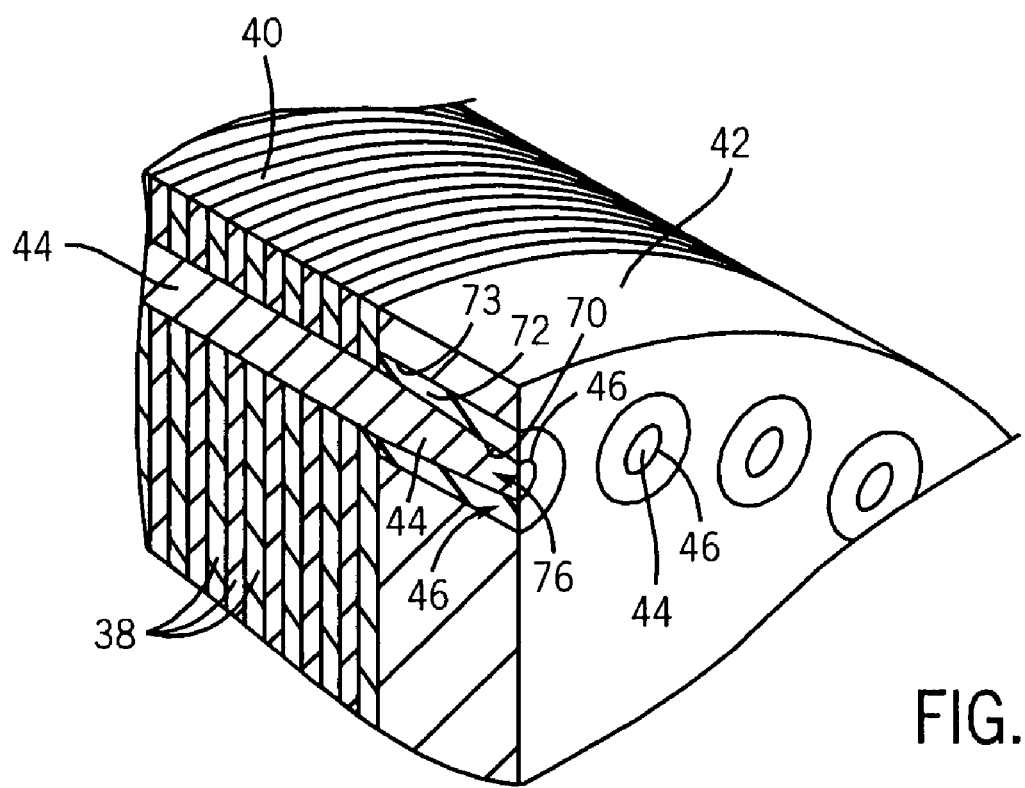
FIG. 5 is a detail, perspective and cross-sectional view of a portion of rotor assembly, in accordance with an embodiment of the present technique.

As illustrated in FIG. 5, the end rings 42 are secured to the rotor core 40 by exemplary securing members 46 that are each disposed in an end slot 66 and circumscribed about a conductive member 44. In the exemplary embodiment, each securing member 46 has a cylindrical body that includes an inner surface 70 that abuts against the conductor bar 44 and an outer surface 72 that abuts against the perimetric surface 73 of the end slot 66. However, as will be appreciated for those of ordinary skill in the art in view of the present description, the securing member 46 may present a number of shapes and profiles. For example, the body need not be limited to a cylindrical shape. Additionally, the body may comprise a single piece in abutment with both the conductor bar 44 and the end slot 66 or may comprise an assembly of pieces that abuts the conductor bar 44, in turn, the perimeter of the end slot 66.

The securing members 46, by way of example, establish a series of interference fits between the inner surface 72 and the conductor bar 44 as well as between the outer surface 72 and the perimetric surface 73 of the end slot 66. In turn, these interference fits, in cooperation with interference fits on the end ring 42, restrict movement of the end rings 42 with respect to the rotor core 40 and, as such, secure the end rings 42 to the rotor core 40. Additionally, the abutment of the exemplary securing member 46 with the conductor bar 44 and the end ring 42 facilitates electrical conductivity between the end ring 42 and the conductor bar 44. That is, the exemplary securing member 46 electrically couples the conductor bar 44 to the end ring 42, and, in turn, electrically couples the conductor bars 44 to one another. Advantageously, the interference fits provide a mechanical connection between the conductor bars 44 and the end ring 42, thereby electrically and physically connecting the end members and conductor bars 44 with respect to one another without affecting the material properties of either structure. To help facilitate the engagement between the securing members 46 and the conductor bars 44, the interior surface 70 of the exemplary securing member 46 tapers in a manner corresponding to the tapered end 76 of the conductor bar 44.

In the exemplary embodiment, the securing member 46 is formed of a malleable and electrically conductive material, such as copper. As one example, the securing member 46 can be formed of a copper having a hardness of H0 (as measured in accordance with the standards of the American Society for Testing and Material or ASTM). The securing member 46 may have a hardness rating (i.e., lower yield strength) than the conductors bars 44, because the securing members 46 are sandwiched between the conductor bars 44 and the end slots 66 and, as such, receive support from these elements of the rotor assembly. Advantageously, the malleability of the securing members 46 facilitates the correction of manufacturing errors and increases acceptable tolerances with respect to the conductor bars 44 and the end members 42 (e.g., end slots 66). In other words, the malleable material of the securing members 46 accommodates for dimensional discrepancies between the planned and manufactured components of the rotor, for instance. As an additional benefit, using a material with a lower yield strength for the securing members 46, as compared to the conductor bars 44, can facilitate a reduction in manufacturing costs, for example.

Keeping FIGS. 1-5 in mind and including FIGS. 7-9 in the discussion, FIGS. 6A and 6B present in block form an exemplary process for assembling the above-described rotor. It is worth noting that FIGS. 7-9 present an exemplary assembly that facilitates the described assembly process, and, as such, is described in conjunction with the exemplary process. However, this assembly also presents benefits in other venues and should not be limited to use only with the described process.

As illustrated in FIGS. 6A and 7, the exemplary process includes the act of assembling an arbor 82 with respect to a base structure 84, as is represented by block 86. Specifically, the arbor 82 is inserted into a central chamber 86 that extends axially through the base structure 84. Advantageously, the good fit between the outer surface of the received arbor 82 and the inner surface defining the central chamber 86 laterally secures the arbor 82. Furthermore, downward axial movement, with respect to the orientation of FIG. 7, is prevented by an enlarged X-shaped center portion 90 of the arbor 82, the center portion 90 having a maximum diameter that is greater than that of the central chamber 86. Upward axial displacement, again with respect to the orientation of FIG. 7, is prevented by a nut 92 fastened to a threaded end 94 of the arbor 82. As illustrated, the threaded end 94 of the arbor 82 extends into but not beyond a centrally located recess 96 of the base structure 84, facilitating level placement of the base-structure 84. Once assembled, an upper surface 98 of the base structure 84 and the arbor 82 are orthogonal to one another, facilitating assembly of a rotor, as discussed further below.

An end ring 42(b) of the final rotor assembly is placed onto the upper surface 98 of the base structure 84, with the arbor 82 extending through a centrally located aperture of the end ring 42. Block 100 of FIG. 6A represents this step of the exemplary process. Rotor laminations 38 are then placed onto the end ring 42(b), with the arbor 82 extending through the shaft aperture 62 of each rotor lamination 38 to form the rotor core 40. This step is represented by block 102 in the diagrammed process. The number of laminations 38 placed, of course, corresponds to the desired length of the rotor 40. Advantageously, the exemplary center portion 90 of the arbor 82, which, again, carries the rotor laminations 38, is sized to have close tolerance to the diameter of the shaft apertures 62 of the laminations 38, mitigating the likelihood of lateral movement therebetween. Also, the exemplary arbor 82 presents a keyway that matches with a corresponding key located in the shaft apertures 62, and this key-keyway engagement aids in appropriate alignment of the rotor laminations 38 with respect to one another.

If the stack of laminations appears to match the desired rotor core 40 length, the opposite side end ring 42(a) is placed on top of the stack of laminations, as is represented by block 104 in the diagrammed process. This stack is then compressed by placing a hydraulic nut 106 onto a threaded interior region 108 of the arbor 82. Upon hydraulic actuation with an external pump unit, this nut places 3000 pounds of compression force onto the lamination stack, facilitating measurement of the stack to an actual, desired core length. This step in the exemplary process is represented by block 110. The stack is then measured, as represented by block 112. If the lamination stack's length is correct, then the process continues. If, however, the lamination stack's length is not correct, then the hydraulic nut 106 and the upper end ring 42(a) are removed, allowing for the addition or subtraction of laminations 38, as appropriate. Blocks 114, 116, and 118, respectively, represent these steps in the exemplary process. As illustrated, the steps represented by blocks 104, 110, 112, 114, 116, to 118 are repeated until the appropriate compressed lamination stack length is obtained.

Upon assembling the lamination stack to its desired length, the compression nut 106 is removed, as represented by block 120. Removal of the compression nut 106 facilitates the insertion of steel drifts (not shown) into the rotor slots 64 (see FIG. 3). In the exemplary process, four steel drifts are inserted at equally spaced angular locations around the circumference of the rotor core. These steel drifts assist in angularly aligning the rotor laminations 38 and end rings 42a and 42b with respect to one another. These steps in the exemplary process are represented by blocks 122 and 124, respectively. Advantageously, the steel drifts are sized in accordance with the shape of the rotor slots 64 and, thus, closely match the shape of the conductor bars 44. Furthermore, the exemplary drifts include tapped jacks holes and milled flats, to aid in the removal thereof.

Once the rotor laminations 38 have been appropriately aligned, conductor bars 44 are inserted into the rotor slots 64 of the rotor core, except for the rotor slots 64 in which the steel drifts reside. A plastic, protective cap (not shown) may be placed onto the conductor bars 44 prior to insertion, to protect the lower tapered end of the conductor bar 44 (i.e., the end extending into the lower end ring 42(b)). Moreover, to aid in the insertion, the conductor bars 44 may be tapped into place via a rubber mallet, for instance. Again, the conductor bars 44 will present a close tolerance with respect to the rotor slots 64, 0.003 to 0.005 inch tolerance, for example. The insertion of the conductor bars 44 is represented by block 126 in the exemplary process. Once all but four conductor bars 44 have been installed, the steel drifts are removed and replaced with conductor bars 44, as represented by block 128. Again, the milled flats and jack holes facilitate removal of the steel drifts from the rotor slots 64 by providing attachment and grasping locations. As represented by block 130, the compression nut 106 is reinstalled onto the arbor 82, thus applying a compression force to the rotor assembly. For example, the compression nut 106 applies 3000 pounds of force, which translates into a 100 pounds per square inch loading on the exemplary rotor laminations 38.

While the rotor assembly is under compression, the securing members 46, e.g., tapered bushings, are placed into the end slots 66 of the upper end ring 42(a). Specifically, in the exemplary process, two securing members 46 are placed at diametrically opposite end slots 66 (i.e., a pair of end slots 66 that intersect with or are closest to a diameter of the end ring 42). Subsequently, a second pair of securing members is placed at diametrically opposite end slots 66, where the second alignment diameter is orthogonal or closest to orthogonal to the diameter on which the first pair of securing members 42 are located. These four securing members 46 are then tapped, manually with a hammer, for instance, for initial seating of the securing members 46 with the tapered end of the conductor bars 44 and in the end slot 66. Advantageously, the securing members may be tapped in a diagonally alternating manner, assisting in alignment of the end ring 42 with respect to the lamination stack 42. The processes is then repeated by indexing to an angularly most distant pair of securing members 46 and pair of end slots 66 to the already initially seated pairs of securing members, until all of the securing members 46 have been initially seated with respect to the conductor bars 44 and the end slots 66 of the upper end ring 42(a). Block 132 represents these steps in the exemplary process.

A pressure fixture 134 facilitates final insertion or seating of the securing members 46 with respect to the rotor assembly. The exemplary pressure fixture 134 includes a central aperture 136 configured to engage with a threaded end 138 of the arbor 82. Moreover, the exemplary pressure fixture 134 includes a recessed chamber 140, allowing the pressure fixture 134 to surround the compression nut 106 already secured to the threaded interior region 108 of the arbor 82. Block 142 of the diagrammed process represents installation of the pressure fixture 134 onto the arbor 82.

The pressure fixture 134, when hydraulically actuated, provides axially directed insertion forces to the securing members 46, thus securely seating the securing members 46 with respect to the tapered ends of the conductor bars 44 and into the end slots 66 of the upper end ring 42(a). Advantageously, these insertion forces are diametrically opposite from one another to reduce the likelihood of cocking. To provide these insertion forces, the illustrated round pressure fixture 134 with an internal counter bore includes a pair of piston chambers 145 counter sunk with respect to the pressure fixture 134 and located at diametrically opposite angular positions in the pressure fixture 134. Each of the piston chambers 145 carries, at least partially, a piston assembly 146 that comprises a shoulder screw 148 threaded to a piston 150 that is, for the most part, countersunk with respect to the pressure fixture 134. Each piston assembly 146 also includes a compression spring 152 that acts against the surfaces of the piston retention spring chamber 144 and that biases the shoulder screw 148 upwardly, as represented by directional arrow 147. Resultantly, the compression spring 152 biases the piston 150 upwardly as well. Advantageously, to prevent the ingress of contaminants into the piston retention spring chamber 145 and to provide an appropriately sealed piston chamber 145, the piston assembly 146 includes an o-ring 154 disposed circumferentially about the piston 150 and acting against the walls of the piston chamber 145 of the pressure fixture 134.

To actuate the piston assembly 146, a hydraulic pump unit can be coupled to the pressure fixture 134. Advantageously, the exemplary pressure fixture 134 includes pipe fixtures 156 disposed at the upper ends of the piston chambers 144, to facilitate the introduction of hydraulic fluid or a hydraulically actuated member, for example. Once coupled, routing high-pressure hydraulic fluid into the piston chamber forces the piston 150 downwardly against the securing member 46, as represented by directional arrow 158. In turn, the piston 150 applies relatively large and axially directed insertion forces onto the securing member 46, thus well seating the securing member 46 within the end slot 66 and about the tapered end of the conductor bar 44. Advantageously, the piston assemblies 146 are actuated concurrently, thus providing an equal amount of insertion forces to diametrically opposite sides of the rotor assembly, providing for good insertion alignment of the securing members 46 in their respective end slots 66. Moreover, this concurrent and symmetric application of insertion forces to a pair of locations most angularly distant from one another serves to reduce the net moment forces applied to the rotor. Block 160 of the diagrammed process represents actuation of the pistons 150 and full seating of a first pair of the securing members 46 into the end slots 66.

Once the first pair of securing members 46 has been fully seated with respect to the end slots 66 and conductor bars 44, the pressure fixture 134 is indexed (e.g., rotated) to align with a second pair of securing members diametrically opposite to one another and angularly furthest away from the first pair of securing members discussed above. Often, the diameter on which the second pair of securing members resides is orthogonal or substantially orthogonal to the diameter on which the first pair of securing members resides. Block 162 represents this indexing in the diagrammed process. Once indexed, the pressure fixture provides insertion forces to this second pair of securing members 46, thus fully seating the second pair securing members with respect to the rotor conductor bars 44 and end slots 66 and, further, securing the rotor assembly, as is discussed above. Block 164 represents this step in the exemplary process. This indexing procedure is repeated until all of the securing members 46 have been fully seated to the upper end ring 42(a), as represented by block 166. Specifically, the next diametrically opposite pair of securing members 46 angularly furthest away from the already fully seated pairs of securing members are the next to be fully seated.

Upon full insertion of all of the securing members 46 with the upper end ring 42(a), the pressure fixture 134 is decoupled from the arbor 82. Moreover, the compression nut 106 is removed from the arbor 82 as well. Block 168 represents this step in the diagrammed process. Advantageously, the fully seated securing members 46, in cooperation with the seating surface 98 of the base structure 84, prevent movement and disassembly of the upper end ring 42(a), conductor bars 44, and rotor laminations 38 with respect to one another. Additionally, removal of the pressure fixture 134 and the compression nut 106 affords access to the upper end ring 42(a) of the rotor assembly.

Focusing on FIGS. 6B and 9, this access allows for the placement of steel disks 170 onto the outwardly extending portions 172 of the securing members 46. Block 174 represents this step in the exemplary process. Advantageously, the steel disks 170 provide a load transferring mechanism for the adjusting screws 176 of a support fixture 178, as are discussed further below. As illustrated, the steel disks 170 are appropriately sized with respect to the securing members 46 and provide shoulders that transfer the axial loads provided by the support fixture 178 to the securing members 46.

As best illustrated in FIG. 8, the support fixture 178 includes a central chamber 180 that is sized for close tolerances with respect to the arbor 82. Moreover, the support fixture 178 includes a recessed portion 182 into which the arbor 82 extends, but not beyond. This recessed portion 182 allows for the insertion of a securing nut 184 onto the arbor 82, thus securing the support fixture 178 with respect to the arbor 82. Advantageously, the securing nut 184 applies a downwardly directed force that facilitates a flush and good abutment between a support surface 186 of the support fixture 178 and a peripheral surface of the upper end ring 42(a). Block 188 represents this installation step in the exemplary process.

As discussed above, the support fixture 178 includes adjusting screws 176 disposed in chambers extending axially through the support fixture 178. Ideally, the support fixture 178 includes a corresponding number of adjusting screws 176 to the number of end slots 66 in the upper end ring 42(a). Moreover, it is ideal if the angular positioning of the adjusting screws 176 corresponds with the angular locations of the end slots 66 in the upper end ring 42. However, such one-to-one correspondence is, of course, not required. Once aligned with the corresponding securing members 46 and, as such, the corresponding end slots 66, the adjusting screws 176 are actuated to drive the steel disks 170—which are coupled to the adjusting screws 176—axially toward the rotor. As one advantage, the adjusting screws 176 provide support to the installed bushings, as they may be at different elevations after pressing due to diametric tolerances of associated components. Block 190 of the diagrammed process represents this step of alignment and actuation of the adjusting screws 176.

As best illustrated in FIG. 9, the assembly is subsequently rotated, thus placing the base structure 84 on top and the support fixture 178 on the bottom. Block 192 represents this step in the diagrammed process. The base structure 84, along with the hydraulic nut 92, are removed from the arbor 82, as represented by block 194 of the diagrammed process. This removal facilitates the placement of the pressure fixture 134 and compression nut 106 onto the arbor 82 opposite the support fixture 178, as represented by block 196 in the exemplary process. Moreover, this removal facilitates initial placement of the securing members 46, as described in relation to the step in the process represented by block 132, which is discussed above. Block 195 represents this step in the diagrammed process.

Via the pressure fixture 134, a first pair of diametrically opposite securing members 46 are driven axially toward the rotor, thus fully seating these securing members 46. Block 198 represents this step in the exemplary process, and this step is similar to the step represented by block 160, which is discussed above. Once a first pair of securing members 46 is fully seated with respect to the rotor, the pressure fixture is indexed to the angularly furthest diameter pair of securing members, as represented by block 200 of the exemplary process and in a manner similar to the step of block 162, which is discussed above. This second pair of securing members 46 is driven into a fully seated position, and the pressure fixture 134 is indexed to the pair of diametrically opposite securing members 46 angularly furthest from the already seated pairs, until all of the securing members have been fully seated, as represented by blocks 202 and 204, respectively. And these steps, which are represented by blocks 202 and 204, are similar to the steps represented by blocks 164 and 166, respectively.

Once fully seated, the securing members 46 of the first and second end rings 42(*a*) and 42*b* provide for a secured rotor assembly, as is discussed above. Again, the securing members 46(*b*) facilitate a high-strength mechanical engagement, thus mitigating the need for heat-based securing techniques, such as welding and brazing, which can cause annealing and, in turn, lead to a degradation in rotor performance.

Upon assembly, the rotor is removed from the arbor 82, either by removing the support fixture 178 or the pressure fixture 134 or both. Advantageously, the concave surfaces and X-shaped cross-section of the arbor's 82 center section 90 facilitate removal of the rotor with respect to the arbor 82. Block 204 of the diagrammed process represents this step of removal. Once removed, the extended portions 172 of the securing members 46 can be cut or machined, thus becoming flush with the axially outermost peripheral surfaces of the end rings 42. Moreover, the rotor may be turned for machining in accordance with desired protocols. Moreover, a shaft 26 (see FIG. 2) is inserted into the shaft aperture 62 of the rotor, completing the assembly. These steps are represented by block 206 of the diagrammed process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of assembling a rotor having a plurality of rotor laminations disposed between first and second end rings, comprising:
   supporting the rotor on a seating surface of a base structure having a arbor extending from the base structure such that the arbor extends through a shaft chamber of the rotor;
   providing insertion forces to a first set of diametrically opposite securing members positioned with respect to the first end ring to drive securing members axially inward with respect to the rotor, about conductor bars of the rotor and into end slots of the first end ring; and
   providing insertion forces to a second set of diametrically opposite securing members positioned with respect to the first end ring to drive securing members axially inward with respect to the rotor about conductor bars of the rotor and into end slots of the second end ring;
   wherein each of the securing members has an interior section dimensioned to receive the conductor bar with a press fit to secure the conductor bar to the securing member, and an exterior section dimensioned to be press fit in the end slots of the end ring to secure the securing member to the end rings.

2. The method as recited in claim 1, comprising coupling to the arbor opposite the base structure a support fixture having a pair of members extending therefrom to support the securing members.

3. The method as recited in claim 2, comprising uncoupling the base structure with respect to the arbor.

4. The method as recited in claim 3, comprising coupling a pressure fixture having a pair of piston assemblies located diametrically opposite one another on the pressure fixture, the pressure fixture being located opposite the support structure.

5. The method as recited in claim 4, comprising providing the insertion forces via the pressure fixture.

6. The method as recited in claim 1, comprising aligning the rotor laminations of the rotor by inserting a steel drift into rotor slots of the rotor.

7. The method as recited in claim 1, comprising applying compression forces to the rotor via a compression nut coupled to the arbor.

\* \* \* \* \*